United States Patent
Rambosek

(10) Patent No.: US 6,628,479 B1
(45) Date of Patent: Sep. 30, 2003

(54) DOOR ASSEMBLY FOR A DATA STORAGE CARTRIDGE

(75) Inventor: G. Phillip Rambosek, Shafer, MN (US)

(73) Assignee: Imation Corp., Oakdale, MN (US)

( * ) Notice: Subject to any disclaimer, the term of this patent is extended or adjusted under 35 U.S.C. 154(b) by 294 days.

(21) Appl. No.: 09/675,080

(22) Filed: Sep. 28, 2000

(51) Int. Cl.[7] .......................................... G11B 23/107
(52) U.S. Cl. ..................... 360/132; 242/326.2; 242/348
(58) Field of Search ....................... 360/132; 242/347.1, 242/348, 348.2, 348.3, 338, 326.2

(56) References Cited

U.S. PATENT DOCUMENTS

| | | | | |
|---|---|---|---|---|
| 5,610,789 A | * | 3/1997 | Miller | 360/132 |
| 6,349,892 B2 | * | 2/2002 | Morita et al. | 242/347.1 |
| 6,435,439 B1 | * | 8/2002 | Ishihara et al. | 242/348.2 |

FOREIGN PATENT DOCUMENTS

| | | | |
|---|---|---|---|
| EP | 0 924 701 A2 | | 6/1999 |
| EP | 0 924 703 A1 | | 6/1999 |
| EP | 0 926 675 A1 | | 6/1999 |
| EP | 0 926 676 A1 | | 6/1999 |
| JP | 11-185434 A | * | 7/1999 |
| JP | 11-213613 A | * | 8/1999 |
| JP | 11-265560 A | * | 9/1999 |
| JP | 11-306722 A | * | 11/1999 |
| JP | 2000-21127 A | * | 1/2000 |
| JP | 2000-76821 A | * | 3/2000 |
| JP | 2001-35127 A | * | 2/2001 |

* cited by examiner

Primary Examiner—Jefferson Evans
(74) Attorney, Agent, or Firm—Eric D. Levinson

(57) ABSTRACT

A data storage cartridge (10) includes a door and door spring assembly (30). The door and door spring assembly (30) includes a door member (31) and an elongate member (32) having a first end (31*a*) operatively connected to the door member (31). A spring (33) is mounted on the elongate member (32). A slidably mounted stop (34) is operatively connected to the housing (12). The stop (34) has a containment member, wherein the spring is maintained in position by the stop (34).

16 Claims, 8 Drawing Sheets

DOOR ASSEMBLY FOR A DATA STORAGE CARTRIDGE

BACKGROUND OF THE INVENTION

This invention relates generally to a data storage tape cartridge and more particularly to a data storage tape cartridge having a door and door spring assembly.

Data storage tape cartridges have been used for decades in the computer, audio and video fields. The data storage tape cartridge continues to be an extremely popular form of recording large volumes of information for subsequent retrieval and use. The data storage tape cartridge typically has a tape access opening. The tape access opening is removably covered by a door assembly. The door assembly is closed when the data storage tape cartridge is not in use. Then, when it is necessary to access the information contained in the data storage tape cartridge, the door is opened. A spring has been used in the past to provide a biasing force to normally bias the door in a closed position. The spring has one end biased against the door and another end biased against the cartridge. In this way, the spring typically holds the door closed over the tape access opening. Then, when access is needed, the door is slid away and the spring compresses to allow movement of the door. While such spring assemblies have been used in the past, they have the inherent problems of being difficult to assemble, and therefore expensive, as well as susceptible to later jarring which may release the spring from its desired position.

The present invention addresses the problems associated in the prior art noted above.

SUMMARY OF THE INVENTION

The present invention is a data storage cartridge which includes a housing having a first section and a second section operatively connected to form the housing. The housing defines a tape access opening. A door assembly is slidably mounted to the housing for movement between an open position and a closed position proximate the tape access opening. The door assembly includes a door member, an elongate member having first and second ends, the first and second ends operatively connected to the door member and a spring having first and second ends, the spring mounted on the elongate member. A slidably mounted stop is operatively connected to the housing. The stop has a containment member, wherein the spring is maintained in position by the stop.

In another embodiment, the invention is a data storage cartridge with a housing having a first section and a second section operatively connected to form the housing. The housing defines a tape access opening. A door assembly is slidably mounted to the housing for movement between an open position and a closed position proximate the tape access opening. The door assembly includes a door member, an extension member having first and second ends, the first end operatively connected to the door member and a biasing member having first and second ends positioned between the door member and the housing, biasing the door member in the closed position. A slidably mounted stop is operatively connected to the housing. The stop is proximate the second end of the biasing member and the stop maintains the spring in position.

In another embodiment, the invention is a method of making a data storage cartridge having first and second sections to form a housing. The method includes inserting a tape reel inside a first section of the housing. A spring, having first and second ends, is then placed around an elongate member. The elongate member has first and second ends, the first end of the elongate member being operatively connected to the door member. A stop is slidably mounted to the housing. The door member is placed in front of the tape access opening and the elongate member is positioned proximate the stop. Then, the method includes securing the second section to the first section, wherein the second section holds the stop in place and the stop maintains the spring in position.

DETAILED DESCRIPTION OF THE PREFERRED EMBODIMENT

Figure 1:
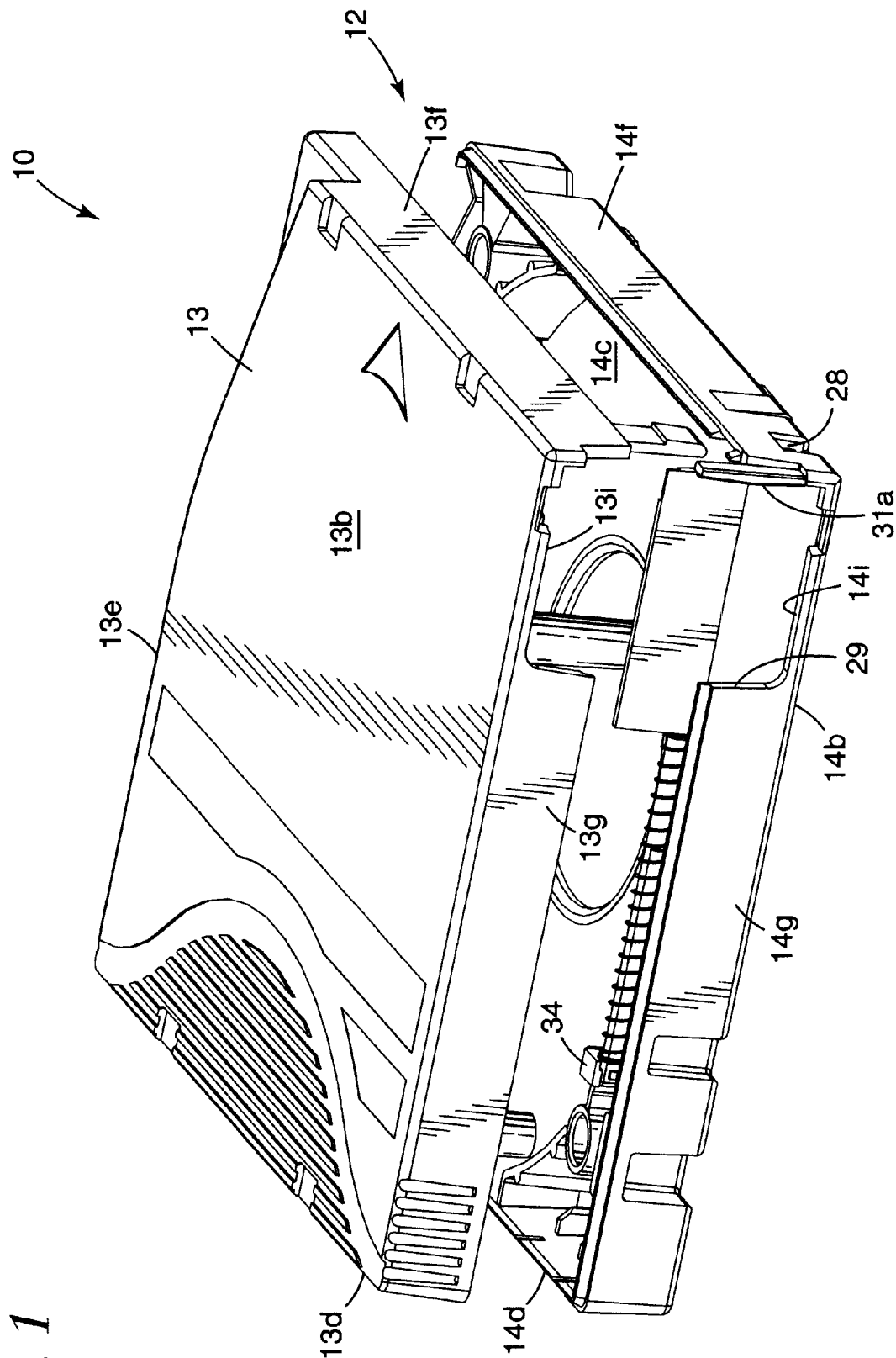
FIG. 1 is an exploded perspective view of the data storage cartridge of the present invention.

Referring to the drawing, wherein like numerals represent like parts throughout the several views, there is generally disclosed at 10 a data storage cartridge. Generally speaking, the data storage tape cartridge 10 includes a housing 12 having a first section 13 and a second section 14. A tape reel assembly (not shown) is utilized to house the storage tape. The storage tape is wound around the tape reel assembly.

The housing 12 is preferably sized to receive a typical tape drive (not shown). Thus, the housing 12 may be sized for use with a 5.25 inch (130 millimeter) form factor drive or a 3.5 inch (90 millimeter) form factor drive or other useful sizes. In one preferred embodiment, the first section 13 forms a cover whereas the second section 14 serves as a base. It should be understood that the directional terminology such as "cover", "base", "upper", "lower", "top", "bottom", "first", "second", etc. are used for the purposes of illustration only, and are in no way limiting.

The first section 13 has a planar member 13a that has a top surface 13b and a bottom surface 13c. Four sidewalls 13d–13g depend generally at a 90 degree angle from the planar member 13a. Arcuate walls 17–19 are formed which define a cavity for the tape reel assembly. Four cylinders 20 extend from the planar member 13a and have openings 20a at one end. The cylinders are hollow to receive a screw. An elongate brake post 21 extends away from the planar member 13a. The brake post 21 engages a brake button (not shown) which in turn engages the tape reel assembly. The second section 14 has a planar member 14a which has an outer surface 14b and an inner surface 14c. Four sidewalls 14d–14g depend generally at a 90 degree angle from the planar member 14a. An aperture 14h is formed in the planar member 14a and provides access for a tape drive to the tape reel assembly. There are three arcuate inner walls 97 through 99 which correspond to arcuate walls 17–19 to form a cavity for the tape reel assembly. Cylindrical posts 22 extend from the planar member 14a and the four cylindrical posts 22 are in alignment with the cylinders 20. The cylindrical posts 22 have an opening 22a and another opening (not shown) at the other end on the top surface 14b. The cylinders 20 are sized and configured to fit inside the cylindrical posts 22. Then, when assembled, screws (not shown) are inserted through the openings (on surface 14b) of the cylindrical post 22 and tighten the secure the two sections together to form the housing 12. Preferably, the sections 13 and 14 are formed as separate integral moldings from a suitable material such as polycarbonate. The data storage cartridge 10 described thus far is typical for data storage cartridges, the construction of which is well known in the art. It is also understood that the present invention may also be utilized with other data storage cartridges of similar design.

An additional method of securing the sections together and forming a secure connection proximate the tape access opening is provided by a hook member 27 which forms a snap fit with an opening 28 formed in sidewall 14f However, it is understood that such an additional securing method is optional.

The door and door spring assembly, generally designated at 30, includes a door member 31, an extension member or elongate member 32, a biasing means or spring 33 and a stop 34. The door member 31 is a generally planar rectangular member and is sized to cover the tape access opening 29. The tape access opening 29 is formed by the combination of the opening 14i formed in sidewall 14g and the opening 13i formed in the sidewall 13g. The door member 31 has a handle 31a that extends generally outward and is used for the tape drive to slide the door member 31. An extension member 32 is generally elongate and has a first end 32a operatively connected to the door member 31 and a second end 32b. The extension member 32 is generally cylindrical with a flat edge 32a. The extension member 32 and door member 31 are preferably formed as an integral one-piece unit. The extension member 32 is preferably circular so that it may slide into the spring 33. The spring 33 is sized so as to slide over the extension member 32.

The second section 14 includes a retaining wall 40 that is operatively connected to the planar member 14a. The retaining wall 40 and the sidewall 14g form a slot 41. Similarly, the first section 13 includes a retaining wall 50 operatively connected to the planar member 13a, thereby forming a slot 51. The slots 41, 51 serve to guide and retain the door member 31 as it slides between an open and closed position. A protrusion 52 extends generally perpendicular from the sidewall 13g and is positioned over a stop 34, as will be described more fully hereafter, to retain the stop 34.

A mounting member 43 extends generally perpendicular to the sidewall 14g. The mounting member 43 is generally rectangular and has a V-shaped slot 43a formed at its top to assist in positioning the stop 34. A retaining wall 44 is in general alignment with the mounting member 43 and is positioned between the sidewall 14g and the mounting member 43. The retaining wall 44 has an opening 44a. The opening 44a has a generally planar edge 44b and a semi-circular edge 44c. The edges provide a retaining wall which encompasses approximately 270 degrees of a circle as will be described more fully hereafter. First and second slide blocks 45, 46 are operatively connected to the planar member 14a. The slide blocks 45, 46 have a planar top surface 45a, 46a which form a support for the extension member 32. The planar members 13a, 14a have a depression which is slightly below the bottom surfaces 13c, 14c and is designated 13h, 14h. The depressions 13h, 14h extend into the areas defined by the slots 41, 51 and can therefore be viewed as extensions thereof, and also assist in the guiding of the door member 31.

Figure 2:
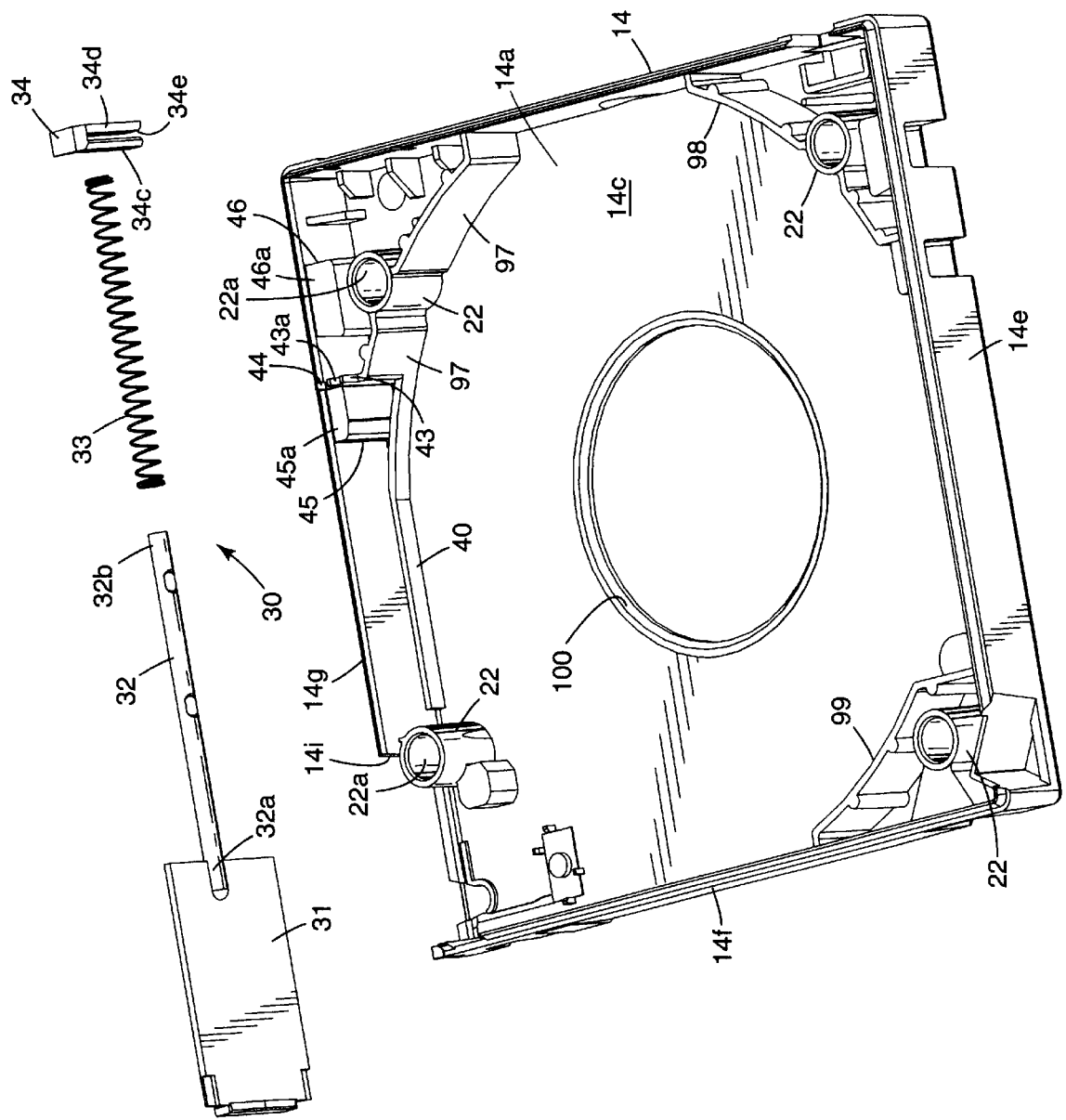
FIG. 2 is an exploded perspective view of a portion of the housing and door assembly as shown in FIG. 1.
Figure 3:
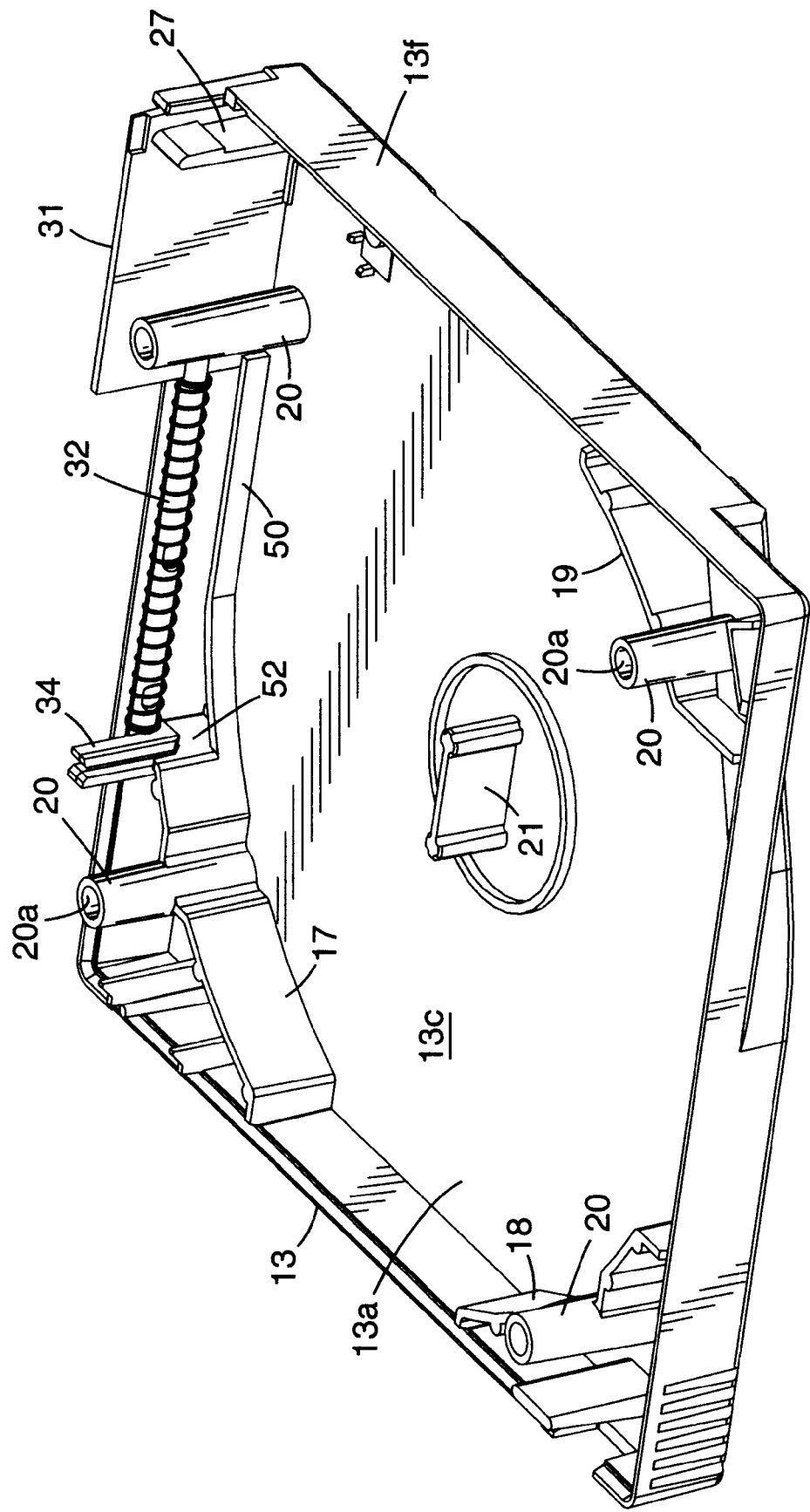
FIG. 3 is a perspective view of a section of the housing shown in FIG. 1.
Figure 5:
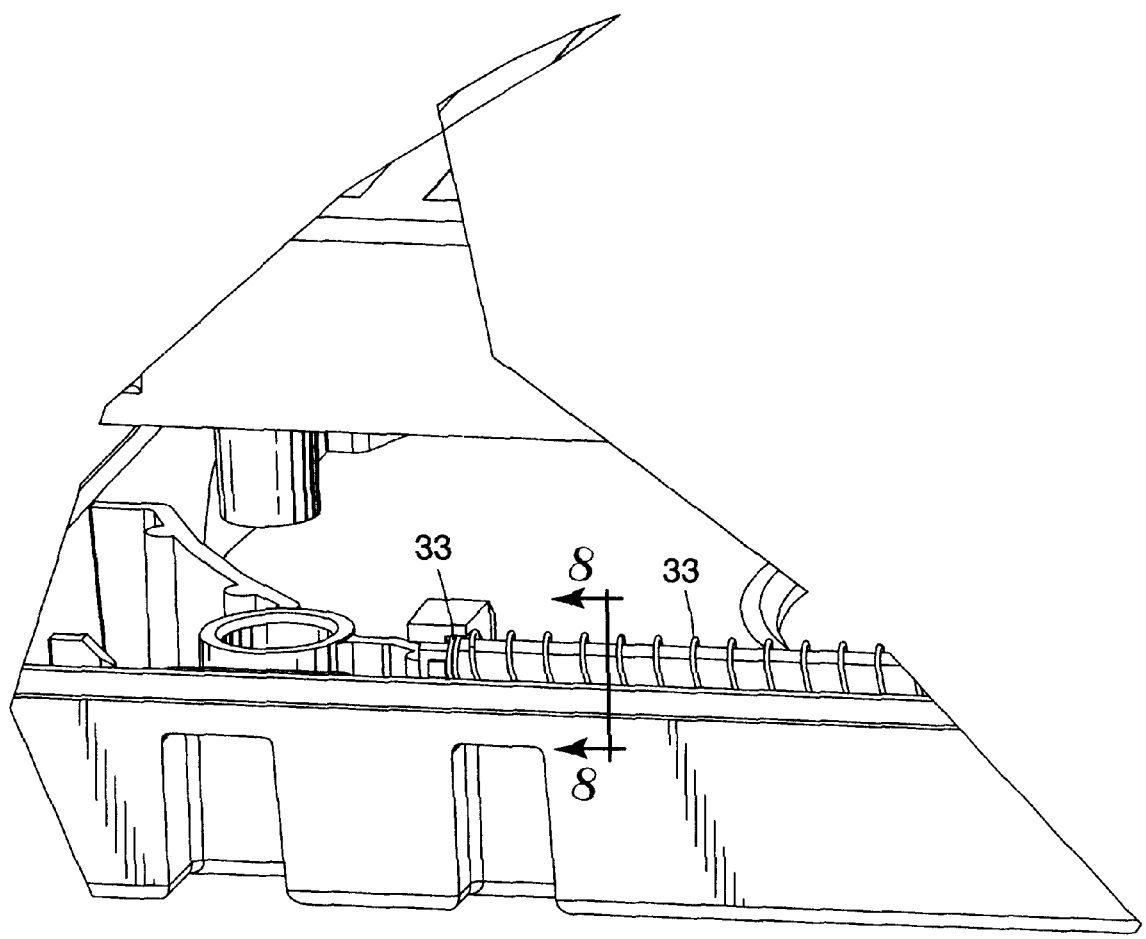
FIG. 5 is an enlarged perspective view of a portion of the cartridge shown in FIG. 1.
Figure 6:
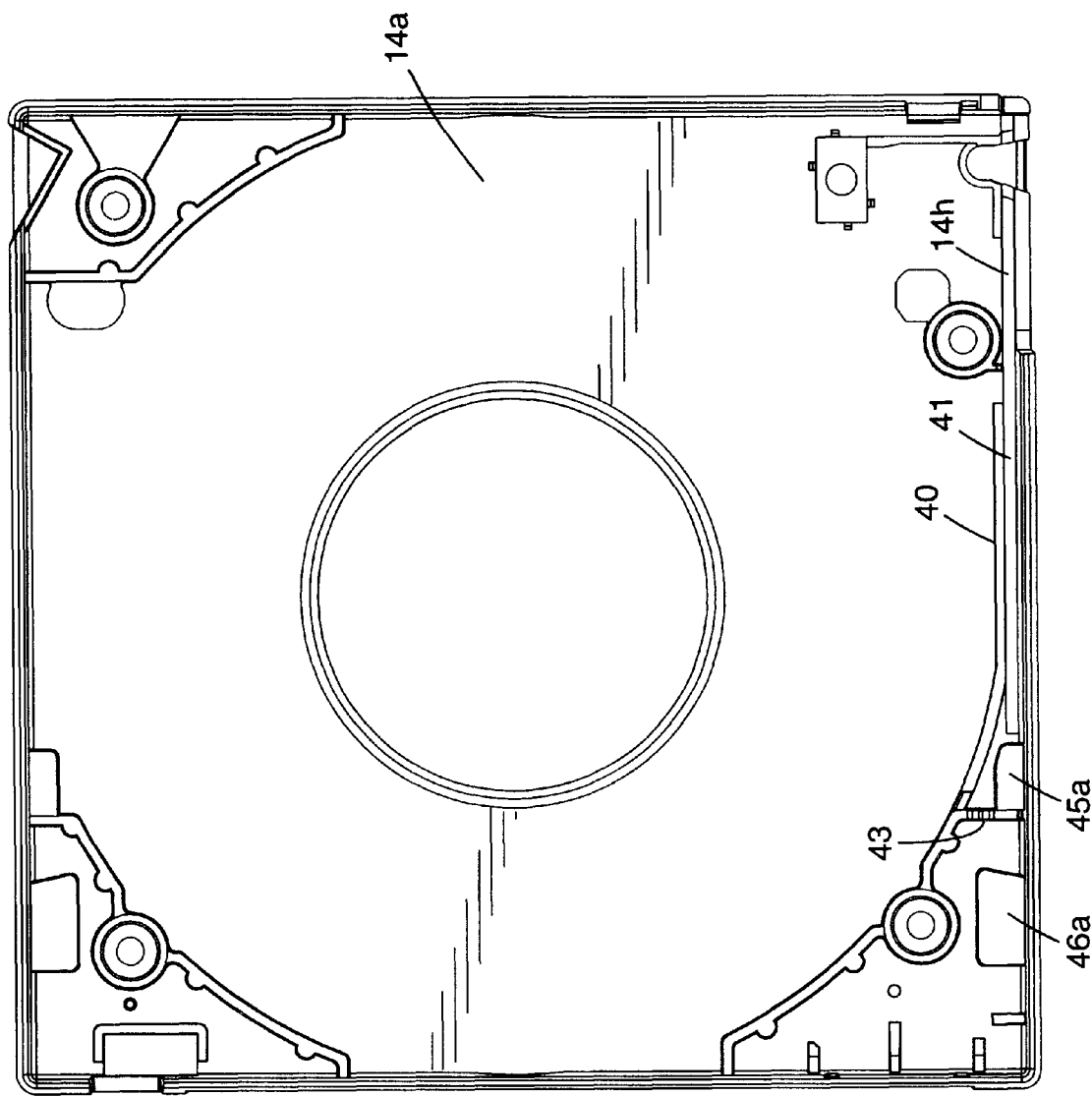
FIG. 6 is a plan view of the section of housing shown in FIG. 4.
Figure 7:
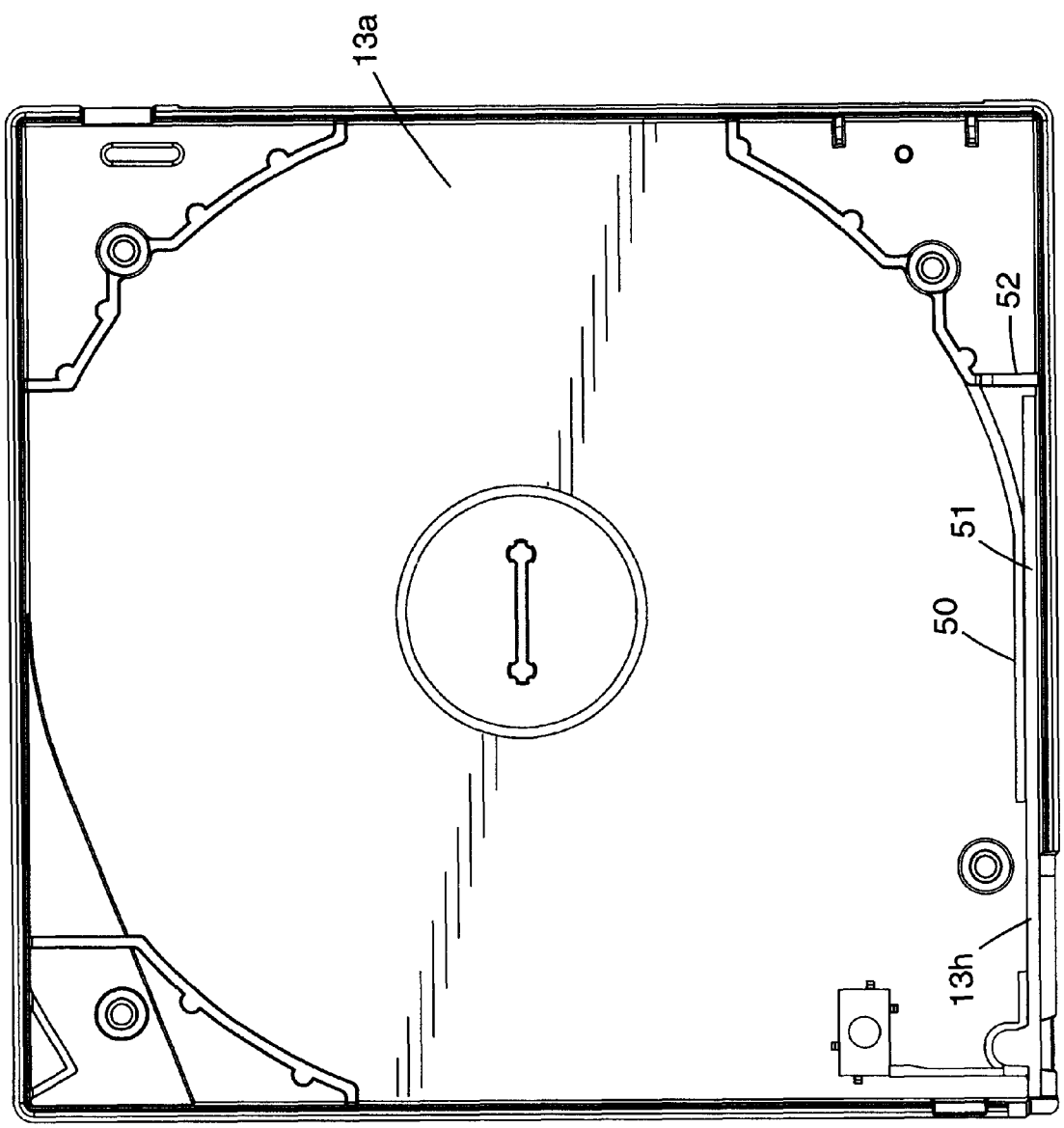
FIG. 7 is a plan view of the section of housing shown in FIG. 3.
Figure 9:
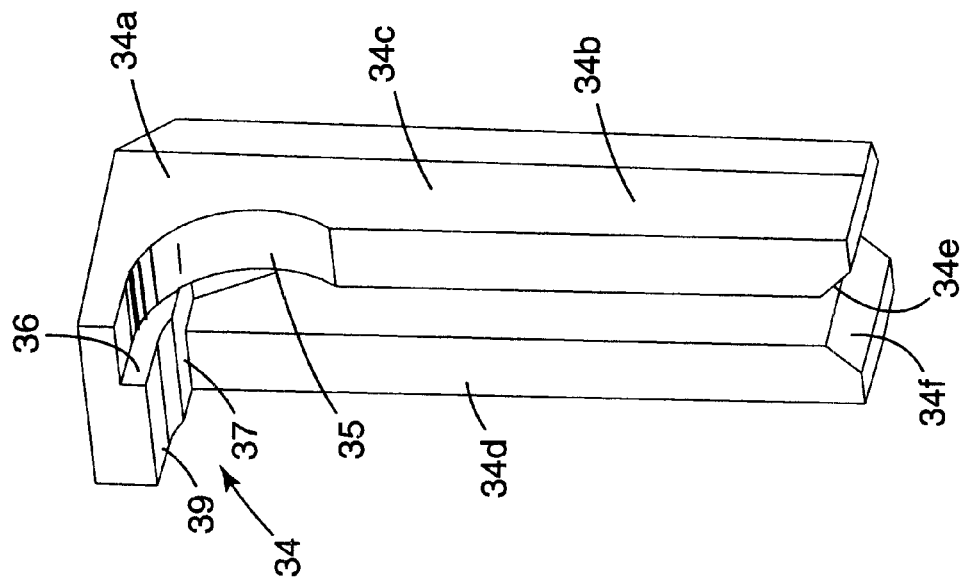
FIG. 9 is an enlarged perspective view of the stop shown in FIG. 1.
Figure 8:
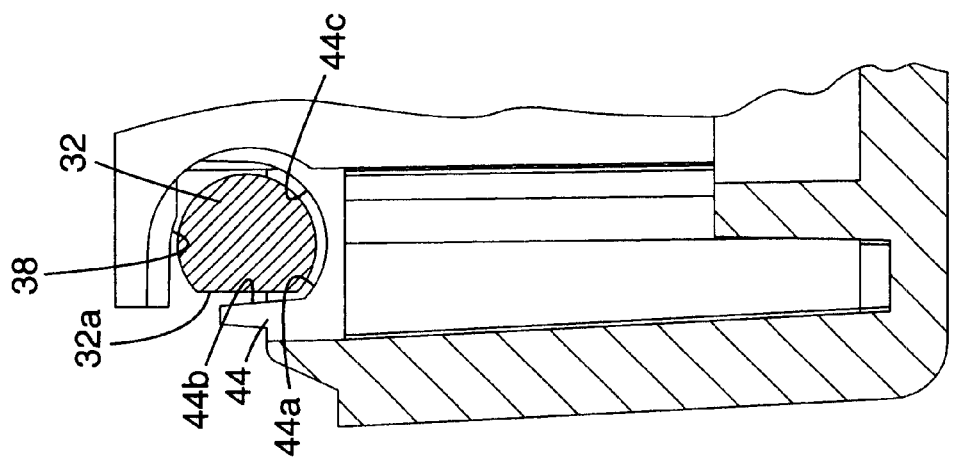
FIG. 8 is a cross-sectional view of a portion of the cartridge shown in FIG. 5 taken generally along the lines 8—8.

The stop 34 has a body which has a top portion 34a and a bottom portion 34b. The bottom portion 34b includes a first leg 34c and a second leg 34d. A slot 34e is formed by and between the two legs 34c, 34d. The elongate slot 34e is sized and configured to fit over the mounting member 43 so that the stop 34 may easily be assembled without the need for additional fasteners. It is also understood that other suitable methods may be used to mount the slidable stop 34 to the mounting member 43 such as a snap fit or other means which allow for the assembling of the stop 34 to the mounting member 43. The legs 34c, 34d have angled bottom portions 34e, 34f to make the insertion of the stop 34 over the mounting member 43 easier. The slot 34e extends from the bottom to proximate the top 34a. The portion of the top 34a which is above the first leg 34c includes an arcuate opening 35. The size of the arcuate opening 35 is sized to accommodate the size of the spring 43 so that, as viewed in FIG. 5, the spring 33 is able to fit inside the arcuate opening 35. The top portion 34a above the second leg 34d includes a stop surface 36. The stop surface 36 is engaged by the end of the spring 33 and retains the spring 33 from moving further to the left, as viewed in FIG. 5. The biasing force of the spring 33 would normally urge the end of the spring 33 to the left as viewed in FIG. 2, however, the stop surface 36 as well as the retaining wall 44 confines the spring 33. The retaining wall 44 and stop surface 36 provide for the combined retaining area which approximates 270 degrees of the end of the circular spring 33, thereby providing an effective retaining system. As can be seen in FIG. 9, the stop surface 36 extends below the top portion of the arcuate opening 35. The top 34a which is positioned above the second leg 34d has three surfaces on the underneath side. There is the first surface 37 which is connected to a third upper surface 39 by an arcuate or second surface 38. The second surface 38 is arcuate and allows for the passage of the extension member 32, as best seen in FIG. 8.

Figure 4:
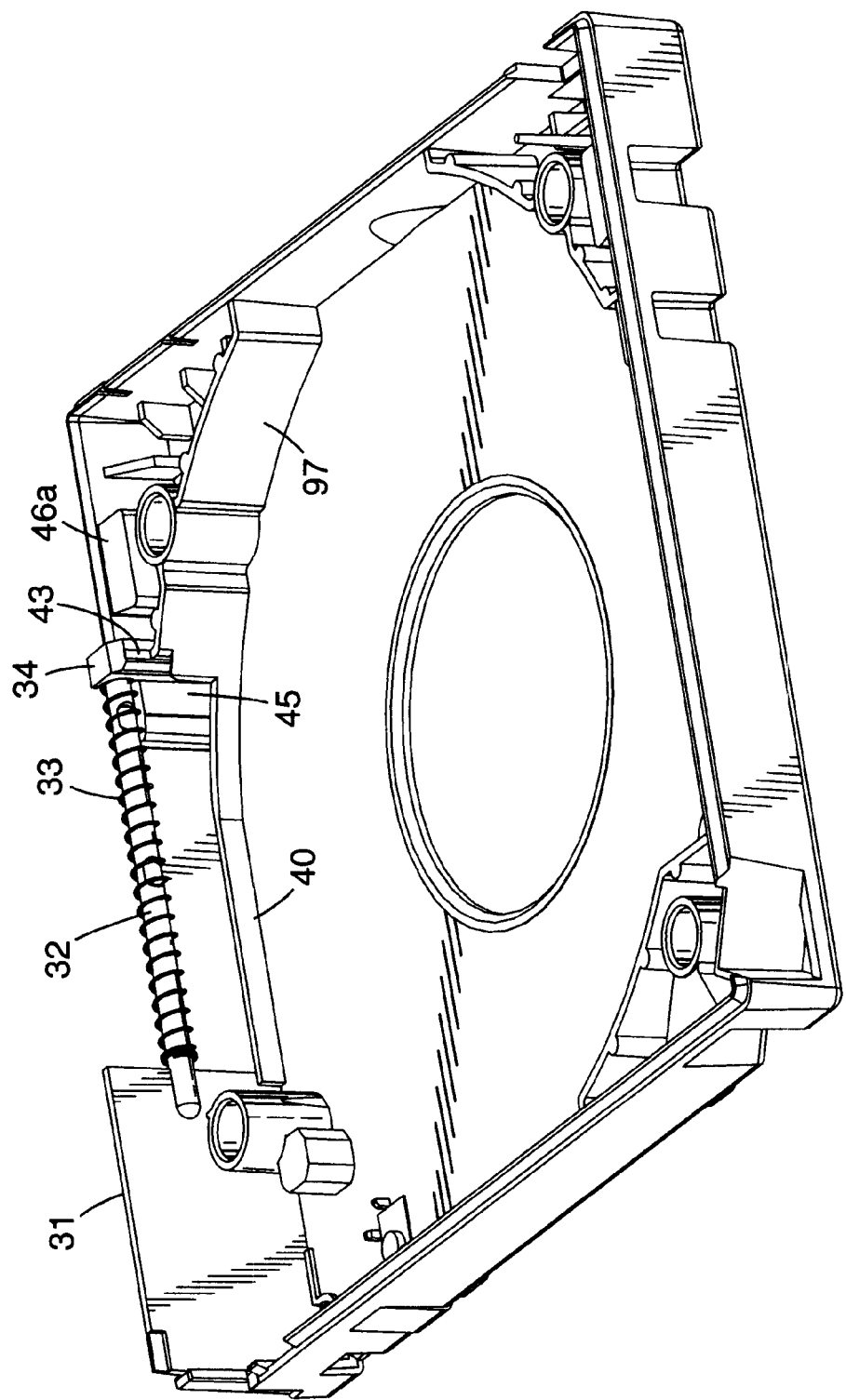
FIG. 4 is a perspective view of a section of the housing as shown in FIG. 1.

In assembling the data storage cartridge 10, the tape reel is inserted inside a first section of the housing. This may be done prior to or after the assembly of the door. The stop 34 is slid onto the mounting member 43. The elongate slot 34e is positioned over the mounting member 43 and the stop 34 is slid downward. The V-shaped slot 43a helping to position the stop 34 into the proper position. The spring 43 is placed around the elongate extension member 32. The elongate extension member 32 is placed in position proximate the stop 34. In placing the extension member 32 in position, the spring and extension member 32 are placed up against the stop 34 inside of the arcuate opening 35. The spring 33 is stopped from going further by the stop member 36 and retaining wall 40. The extension member 32 is free to pass by the retaining wall 40. The door member 31 is positioned in the depression 14h and slot 41. The first section 13a is then placed in position on top of the second section 14a and secured thereto by suitable methods well known in the art. The protrusion 54 is positioned above the top 34a of the stop 34 and retains the stop 34 in position. The spring 33 urges the door member 31 to the left, as viewed in FIG. 4, thereby closing the tape access opening 29. The tape access opening 29 is opened by grasping the handle 31a of the door member 31 and moving it to the right as viewed in FIG. 4. This compresses the spring 33 and moves the door member 31 and extension member 32 to the right. The extension member 32 is positioned on and can rest on the planar surfaces 45*a*, 46*a*. The planar surface 46*a* supports the extension member 32 when the door 31 has moved to its open position.

What is claimed is:

1. A data storage cartridge comprising:
   a) a housing having a first section and a second section operatively connected to form a housing;
   b) the housing defining a tape access opening;
   c) a door assembly slidably mounted to the housing for movement between an open position and a closed position proximate the tape access opening;
   d) the door assembly comprising:
      i) a door member;
      ii) an elongate member having first and second ends, the first end operatively connected to the door member; and
      iii) a spring having first and second ends, the spring mounted on the elongate member; and
   e) a slidably mounted stop operatively connected to the housing such that a position of the stop relative to the housing is fixed upon final assembly, the stop having a containment member, wherein the spring is maintained in position by the stop.

2. The cartridge of claim 1, the stop comprising:
   a) a body having a top and bottom;
   b) the containment member operatively connected to the top of the body; and
   c) the body having an elongate slot from its bottom to proximate its top, the slot for slidably mounting the stop to the housing.

3. The cartridge of claim 2, wherein the body has a first leg and a second leg, the legs separated by the slot and an arcuate section is formed proximate the containment member and the first leg, the arcuate section sized and configured to accommodate the spring.

4. The cartridge of claim 1, further comprising a mounting member operatively connected to the first section of housing, wherein the stop is mounted on the mounting member.

5. The cartridge of claim 4, the mounting member having a slot at its top to position the stop.

6. The cartridge of claim 4, further comprising a protrusion operatively connected to the second section of the housing, the protrusion being positioned over the containment member when the housing is assembled, thereby retaining the stop.

7. The cartridge of claim 1, the first section of housing having a retaining wall in general alignment with the mounting member, the retaining wall having a first surface having a slot formed therein, the first surface stopping movement of the spring.

8. The cartridge of claim 7, wherein the slot of the retaining wall is a support for the elongate member.

9. A data storage cartridge comprising:
   a) a housing having a first section and a second section operatively connected to form a housing;
   b) the housing defining a tape access opening;
   c) a door assembly slidably mounted to the housing for movement between an open position and a closed position proximate the tape access opening;
   d) a door assembly comprising:
      i) a door member;
      ii) an extension member having first and second ends, the first end operatively connected to the door member; and
      iii) a biasing member having first and second ends positioned between the door member and the housing, biasing the door member in the closed position; and
   e) a slidably mounted stop operatively connected to the housing, the stop proximate the second end of the biasing member such that the stop impedes movement of the second end relative to the housing upon movement of the door member from the closed position.

10. The cartridge of claim 9, the stop comprising:
    a) a body having a top and bottom;
    b) the containment member operatively connected to the top of the body; and
    c) the body having an elongate slot from its bottom to proximate its top, the slot for slidably mounting the stop to the housing.

11. The cartridge of claim 10, wherein the body has a first leg and a second leg, the legs separated by the slot and an arcuate section is formed proximate the containment member and the first leg, the arcuate section sized and configured to accommodate the biasing member.

12. The cartridge of claim 9, further comprising a mounting member operatively connected to the first section of housing, wherein the stop is mounted on the mounting member.

13. The cartridge of claim 12, the mounting member having a slot at its top to position the stop.

14. The cartridge of claim 12, further comprising a protrusion operatively connected to the second section of the housing, the protrusion being positioned over the containment member when the housing is assembled, thereby retaining the stop.

15. The cartridge of claim 9, the first section of housing having a retaining wall in general alignment with the mounting member, the retaining wall having first surface having a slot formed therein, the first surface stopping movement of the biasing member.

16. The cartridge of claim 15, wherein the slot of the retaining wall is a support for the extension member.

* * * * *